US012595894B2

(12) United States Patent
Matsushima

(10) Patent No.: US 12,595,894 B2
(45) Date of Patent: Apr. 7, 2026

(54) LIGHT SOURCE DEVICE WITH FLY-EYE INTEGRATOR

(71) Applicant: Ushio Denki Kabushiki Kaisha, Tokyo (JP)

(72) Inventor: Takeo Matsushima, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/074,940

(22) Filed: Mar. 10, 2025

(65) Prior Publication Data

US 2025/0283587 A1 Sep. 11, 2025

(30) Foreign Application Priority Data

Mar. 11, 2024 (JP) ................................ 2024-037080

(51) Int. Cl.
*F21V 5/00* (2018.01)
*F21Y 115/10* (2016.01)

(52) U.S. Cl.
CPC .............. *F21V 5/008* (2013.01); *F21V 5/007* (2013.01); *F21Y 2115/10* (2016.08)

(58) Field of Classification Search
CPC ................................ F21V 5/007; F21V 5/008
See application file for complete search history.

(56) References Cited

U.S. PATENT DOCUMENTS

2022/0397259 A1* 12/2022 Zhang ..................... F21V 5/008
2024/0319610 A1 9/2024 Osawa et al.

FOREIGN PATENT DOCUMENTS

JP 2016-188878 A 11/2016
JP 2016200787 A * 12/2016
JP 6651124 B2 * 2/2020
JP 6970369 B2 11/2021
WO 2018/225774 A1 12/2018
WO 2023/281850 A1 1/2023

OTHER PUBLICATIONS

Nikon, Illumination Optical System, Exposure Apparatus, and Method for Manufacturing Device, 2020, JP6651124B2, https://worldwide.espacenet.com/patent/search/family/057239659/publication/JP6651124B2?q=pn%3DJP6651124B2 (Year: 2020).*

(Continued)

*Primary Examiner* — Tracie Y Green
*Assistant Examiner* — Michael Chiang
(74) *Attorney, Agent, or Firm* — Studebaker Brackett PLLC

(57) ABSTRACT

Some parameters are defined that a focal length of the condensing optical system is f, a width orthogonal to an optical axis and having a maximum width of the collimating optical system is b, an axis coinciding with a line segment constituting the width b is an axis B, a width of a projection image on an axis optically equivalent to the axis B is a, the projection image being on a light emitting surface on a back focus surface of the condensing optical system, and a separation distance between an incident surface of the fly eye lens and a back focus of the condensing optical system is L, the light source device satisfies a predetermined formula.

2 Claims, 10 Drawing Sheets

(56) References Cited

OTHER PUBLICATIONS

Cerma, Light Irradiation Device, Exposure Device and LED Array Light Source, 2019, JP2016200787A, https://worldwide.espacenet.com/patent/search/family/057422989/publication/JP2016200787A?q=pn%3DJP2016200787A (Year: 2019).*

The extended European search report issued by the European Patent Office on Jul. 31, 2025, which corresponds to European Patent Application No. 25162590.1-1001 and is related to U.S. Appl. No. 19/074,940.

* cited by examiner

LIGHT SOURCE DEVICE WITH FLY-EYE INTEGRATOR

CROSS-REFERENCE TO RELATED APPLICATION

The present invention claims the benefit of priority to Japanese Patent Application No. 2024-037080 with the Japanese Patent Office, the entire contents of which are incorporated herein by reference in its entirety.

BACKGROUND OF THE INVENTION

Field of the Invention

The present invention relates to a light source device, and in particular, a light source device including a plurality of light emitting elements.

Description of the Related Art

Conventionally, there has been proposed a light source device that collimates light from a plurality of light emitting elements arranged in an array and then forms an image on a light incident surface of a fly eye integrator by using a condensing optical system (see Patent Document 1).

PRIOR ART DOCUMENT

Patent Document

Patent Document 1: JP-B2-6651124

SUMMARY OF THE INVENTION

The technique described in Patent Document 1 can be used, for example, as a light source for an exposure apparatus. However, in the structure described in Patent Document 1, the light emitting surfaces of the light emitting diodes (LEDs) are projected in an overlapping manner with substantially no deviation as an image reflected on the incident surface of the fly eye integrator. In a case where the light emitting surface of the LED has a non-uniform in-plane distribution, the irradiance distribution becomes non-uniform even on the incident surface of the fly eye integrator. As a result, there is a high possibility that the irradiance distribution becomes non-uniform even on the irradiation surface after the light passes through the fly eye integrator.

In the present patent, the amount of light incident on a unit area is referred to as "irradiance" or "illuminance", and the amount of light radiated from a unit area/unit solid divergence angle is referred to as "radiance" or "luminance".

Usually, in a case where a plurality of light emitting elements is arranged as a light source, light emitting elements having the same size and shape are used as the light emitting elements. Then, for example, in a case where a plurality of light emitting elements in which the light emitting surfaces are each formed with a wiring pattern are arranged as light sources, the wiring patterns are the same. Furthermore, in such a case, the wiring patterns formed on the light emitting surfaces of the light emitting elements are often arranged in the same direction when viewed toward the light emitting surface.

In the light source device adopting such a configuration, because the wiring pattern on the light emitting surface of each light emitting element is a non-light emitting region, a non-uniform in-plane distribution is formed on the LED light emitting surface. Then, by using the plurality of light emitting elements configured with the same wiring pattern, the light emitted from each light emitting element is projected, via the first optical system and the second optical system, on the incident surface of the fly eye integrator disposed in the back focus of the second optical system. A significant difference in irradiance appears between a region where the light emitting regions overlap each other and a region where the non-light emitting regions overlap each other on the projection surface.

The fly eye integrator includes a fly eye lens having a structure including a plurality of lenses in a direction perpendicular to the optical axis direction, and an irradiation lens having a front focus on the emission side of the fly eye lens. At a back focus position (irradiation surface) of the irradiation lens, individual lens surfaces on the incident side of the fly eye lens are projected in an overlapping manner without deviation.

In a case where the light is incident on the fly eye lens, if the incident light distributions in the individual lens surfaces on the incident side are randomly different from each other, because the incident light distributions overlap each other on the irradiation surface, the uniformity of the irradiance distribution can be expected. However, if the incident light distributions in the individual lens surfaces on the incident side are patterned, the irradiance distribution on the irradiation surface becomes highly probably non-uniform even if the incident light distributions overlap each other.

Here, the fact that the non-light emitting region is partially formed on the incident surface of the fly eye lens has been described based on the presence of the wiring pattern. However, regarding the above problem, it is considered that a similar problem possibly occur even in a case where a plurality of light emitting elements is mounted in which the wiring pattern is not formed on the light emitting surface and there is merely variation in radiance patterned on the light emitting surface of the light emitting element.

In view of the above problems, an object of the present invention is to provide a light source device in which there is no significant difference in irradiance on an incident surface of a fly eye lens.

A light source device according to the present invention includes:

- a plurality of light emitting elements;
- a collimating optical system that includes a plurality of lens regions each disposed corresponding to each of the plurality of light emitting elements at a subsequent stage of the plurality of light emitting elements and collimates light from a front focus of the lens regions;
- a condensing optical system that condenses light emitted from the collimating optical system; and
- a fly eye lens on which the light emitted from the condensing optical system is incident, in which,
- in a case where it is defined that a focal length of the condensing optical system is f, a width orthogonal to an optical axis and having a maximum width of the collimating optical system is b, an axis coinciding with a line segment constituting the width b is an axis B, a width of a projection image on an axis optically equivalent to the axis B is a, the projection image being on a light emitting surface on a back focus surface of the condensing optical system, and a separation distance between an incident surface of the fly eye lens and a back focus of the condensing optical system is L, the light source device satisfies the following Formula (1).

[Math 1]

$$0.1 < \frac{b|L|}{af} < 1 \quad (1)$$

In a case where a screen is disposed in the back focus of the condensing optical system, and in a projection image of the light emitting surface of the light emitting element projected on the screen, the width a of the projection image surface is a width of the projection image on an axis having an optically equivalent relationship with the axis B that coincides with a line segment constituting the width b that is the maximum width of the collimating optical system. Here, "an axis coinciding with a line segment constituting the width b" is defined as the axis B. Specifically, "an axis having an optically equivalent relationship with the axis B" includes an axis (an axis A or an axis C in FIG. 1A) that is orthogonal to the optical axis and extends in the same direction as the axis B as illustrated in FIG. 1A described later, and an axis (an axis A or an axis C in FIG. 1B) that is orthogonal to the optical axis and extends in an axial direction having a mirror-image relationship with the axis B about a mirror M as illustrated in FIG. 1B. In addition, the "optical axis" in the present application is an axis LA passing through a center point Ip on the irradiation surface of the light source device. Note that, regarding the direction of the optical axis, in a case where the positive and negative directions are to be distinguished with each other, the direction of light emitted from the light source is referred to as a +LA direction, and the opposite direction thereto is referred to as a-LA direction.

According to the above configuration, the images of the light emitting surfaces of the plurality of light emitting elements are reflected in a mutually shifted state. Therefore, on the incident surface of the fly eye lens, the regions with high irradiance and the regions with low irradiance in the images of the light emitting elements are suppressed from overlapping each other, and the significant difference in irradiance is suppressed.

That is, according to the above configuration, as compared with the light source device of the conventional configuration in which the images of the light emitting surfaces of the plurality of light emitting elements overlap each other and are formed on the incident surface of the fly eye lens without deviation, the significant difference in irradiance is suppressed, and the irradiance distribution is made uniform on the irradiation surface.

In the light source device, in a case where it is defined that a minimum width of an incident surface of the fly eye lens is D, the width D may satisfy the following Formula (2).

[Math 2]

$$D > \frac{b|L|}{f} + a \quad (2)$$

According to the above configuration, substantially all the active components of a bundle of rays collimated by the collimating optical system are incident on the incident surface of the fly eye lens. That is, according to the above configuration, the light emitted from each light emitting element can be more efficiently taken into the incident surface of the fly eye lens.

The fly eye lens is an optical member in which a plurality of lens elements are arranged in a matrix, and each lens element typically has a circular shape, a quadrangular shape, or a hexagonal shape.

Although the outline of the lens element is quadrangular, circular or hexagonal, the outline does not need to correspond to the shape of the lens element.

According to the present invention, a light source device in which a significant difference in irradiance is suppressed on an incident surface of a fly eye lens is realized. As a result, the irradiance distribution on the irradiation surface is made uniform.

DETAILED DESCRIPTION OF THE PREFERRED EMBODIMENTS

A light source device of the present invention is hereinafter described with reference to the drawings. Note that all the following drawings are schematically illustrated, and the numbers of components on the drawings do not necessarily coincide with the actual numbers of components.

Figure 1A:
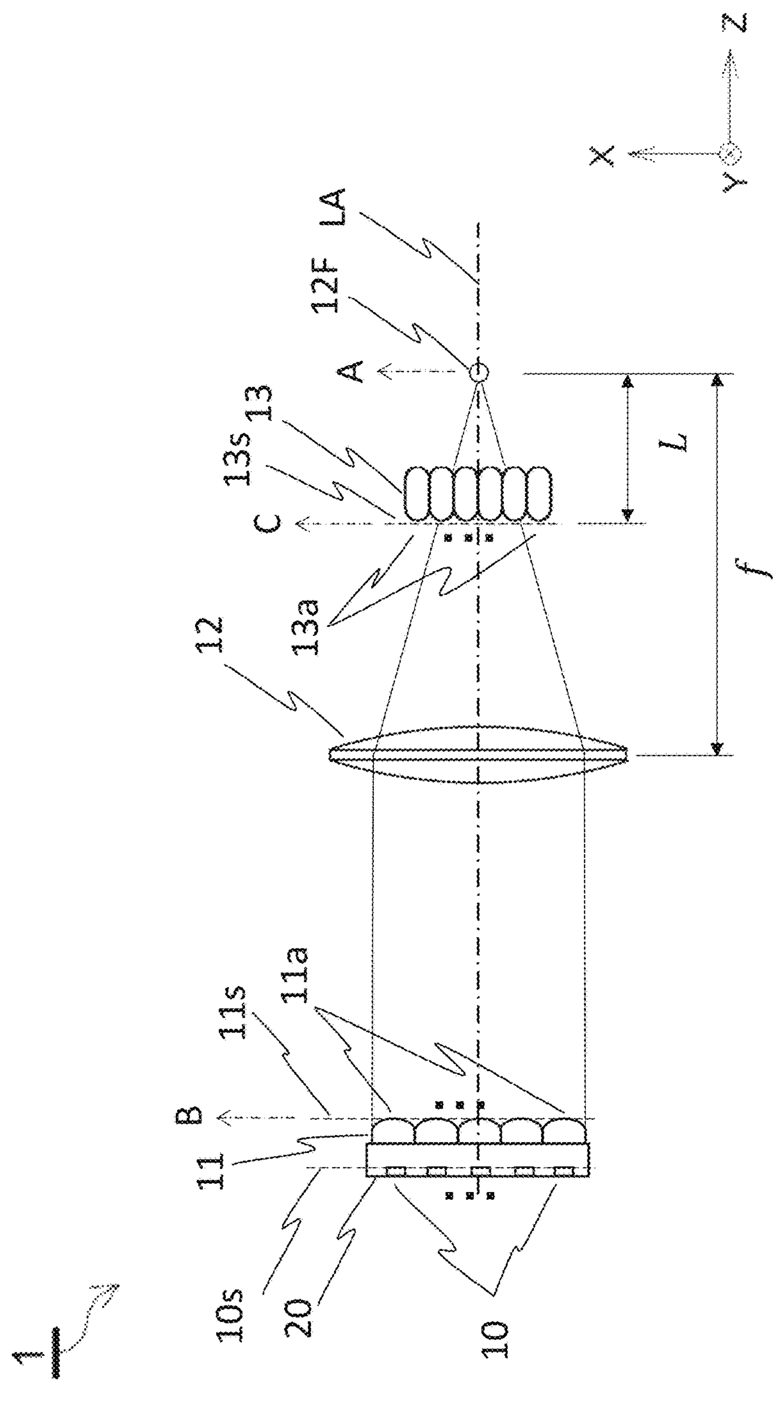
FIG. 1A is a view schematically illustrating a configuration of one embodiment of a light source device.

FIG. 1A is a view schematically illustrating a configuration example of one embodiment of a light source device 1. As illustrated in FIG. 1A, the light source device 1 includes a plurality of light emitting elements (10, 10, . . . ), a collimating optical system 11, a condensing optical system 12, and a fly eye lens 13 which is a component of a fly eye integrator, and in the light source device, the fly eye lens 13 is disposed at a position separated from a back focus 12F of the condensing optical system 12. Furthermore, a front focus of each lens region (11*a*, 11*a*, . . . ) included in the collimating optical system 11 substantially coincides with each center position of a light emitting surface 10*s* of each corresponding light emitting element (10, 10, . . . ). Here, the term "substantially coincide" means that the distance between the front focus and each of the center positions is within a range of 0.5 times to 1.5 times the focal length of the lens region.

Figure 1B:
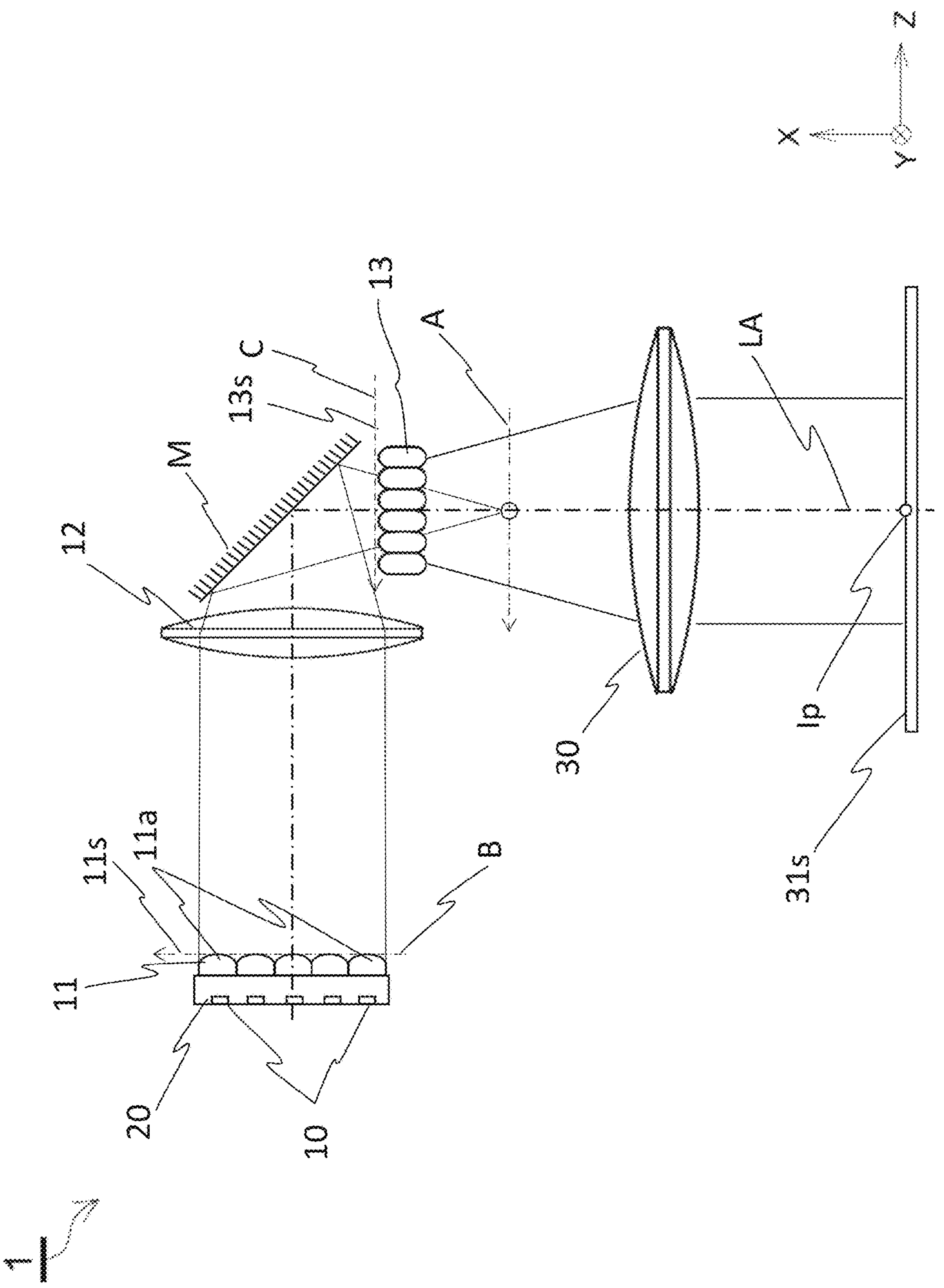
FIG. 1B is a view schematically illustrating a modification of one embodiment of the light source device.

Furthermore, FIG. 1B is a view schematically illustrating a configuration of a modification of the light source device 1 in a manner similar to FIG. 1A.

In FIGS. 1A and 1B, an axis orthogonal to an optical axis LA and coinciding with a line segment constituting a maximum width b of the collimating optical system 11 is defined as an axis B, and an axis optically equivalent to the axis B and passing through the back focus 12F is defined as an axis A. For example, in FIG. 1A, the axis B and the axis A are illustrated as parallel axes extending in the +X direction on the paper surface. However, in the embodiment in which a mirror M is disposed on the optical axis LA as illustrated in FIG. 1B, the axis B is an axis extending in the +X direction on the paper surface, but the axis A and an axis C are each indicated as an axis having a mirror-image relationship with the axis B about the mirror M and an axis extending in the −Z direction on the paper surface. Note that, in each of the arrows in the X direction, the Y direction, and the Z direction illustrated on the paper, a direction indicated by the arrow is a positive (+) direction, and the opposite direction is a negative (−) direction.

Figure 2:
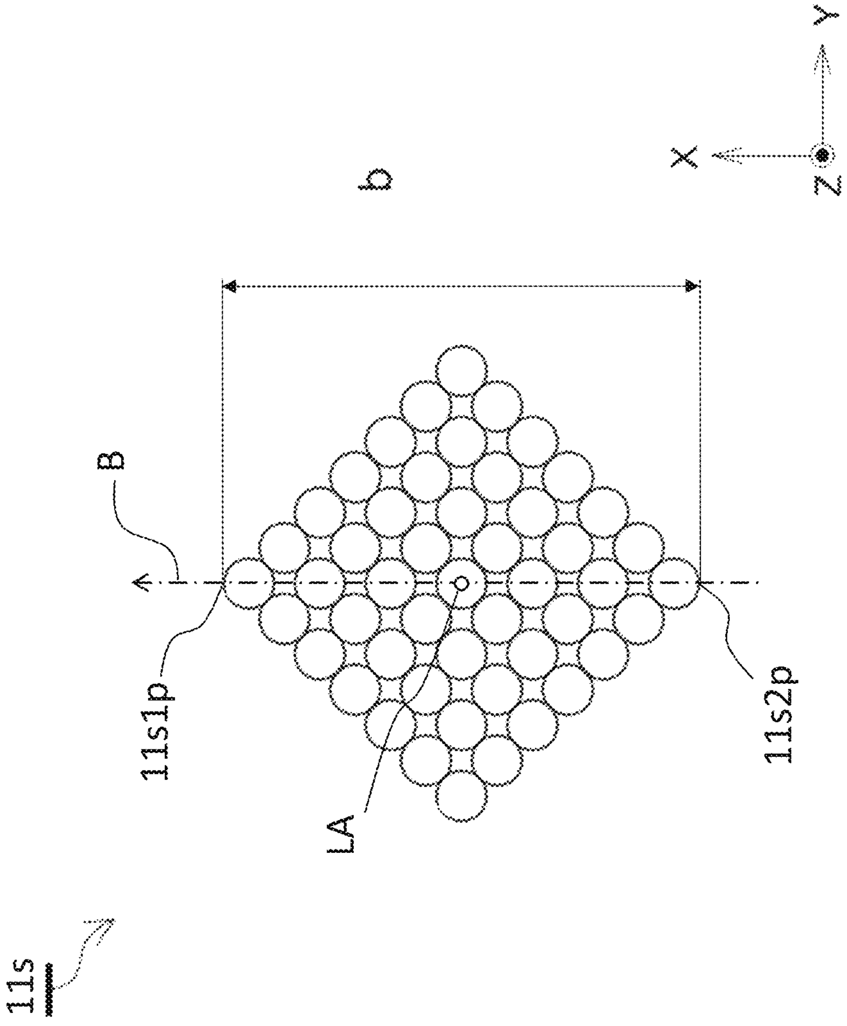
FIG. 2 is a view schematically illustrating a structure at the time when a collimating optical system is viewed in an optical axis direction (−LA direction) from the side of a condensing optical system.

FIG. 2 is a view schematically illustrating a structure at the time when a light emission surface 11*s* of the collimating optical system 11 is viewed in the optical axis direction (−LA direction) from the side of the condensing optical system 12. The maximum width b of the collimating optical system is a length between an end 11*s*1*p* and an other end 11*s*2*p* having the maximum width of the collimating optical system 11.

An axis passing through the end 11*s*1*p* and the other end 11*s*2*p* having the maximum width of the collimating optical system 11 illustrated in FIG. 2 is defined as the axis B. Note that, in the light emission surface 11*s* of the collimating optical system 11, an incident surface 13*s* of the fly eye lens 13, and a back focus surface 12Fs of the condensing optical system (see FIG. 3A described later) when viewed in the optical axis direction (−LA direction), the axis B does not extend in the same direction (for example, the X direction) on the paper surface in all the cases, but extends in an optically equivalent direction.

Figure 3A:
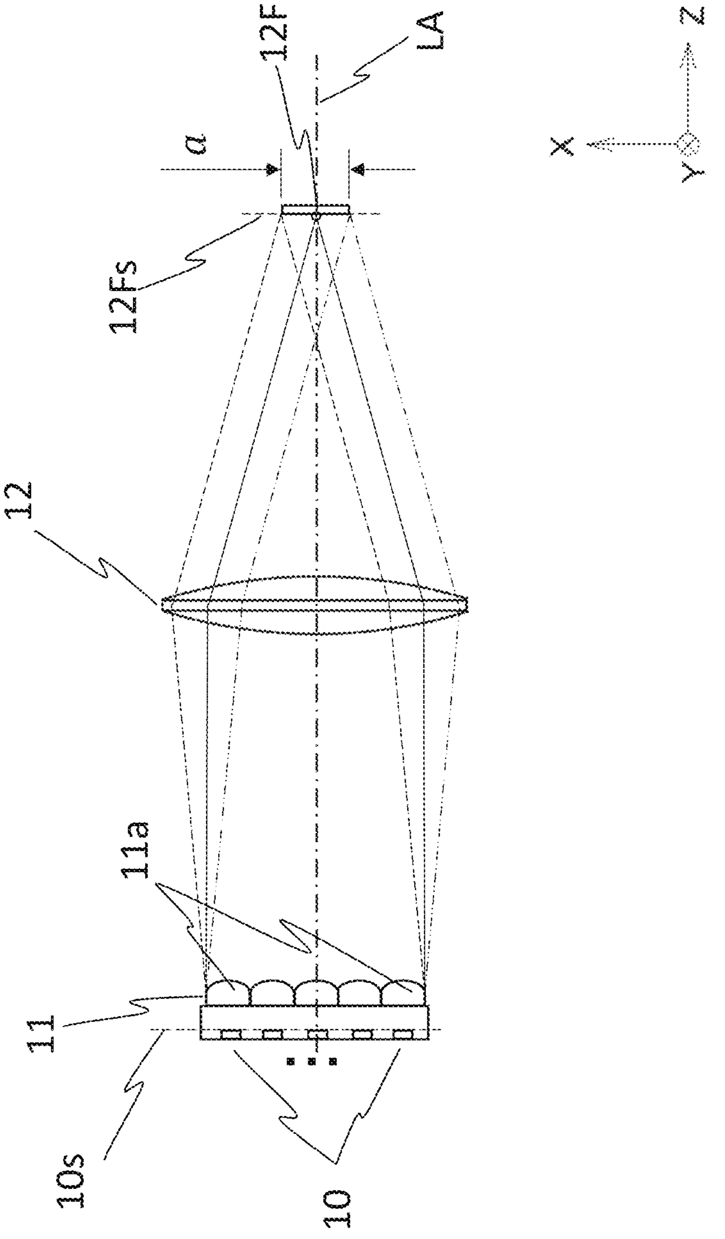
FIG. 3A is a view schematically illustrating a state in which a fly eye lens is excluded from the configuration and light emitted from an end of a collimator lens forms an image at a back focus of the condensing optical system.

FIG. 3A is a view schematically illustrating a state in which the fly eye lens 13 is excluded from the configuration of FIG. 1 and light emitted from each light emitting element 10 forms an image at the back focus surface 12Fs of the condensing optical system.

Figure 3B:
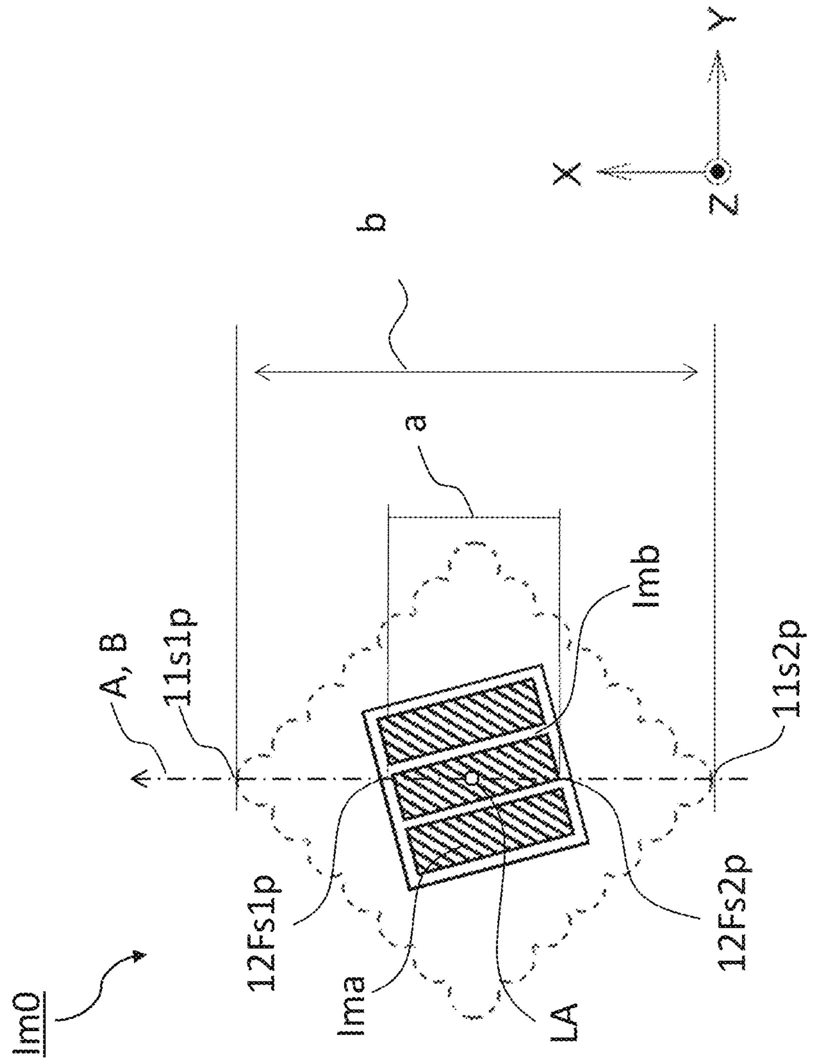
FIG. 3B is a view schematically illustrating an example of a correspondence relationship between an image formed at the back focus of the condensing optical system and the collimating optical system in the optical system in FIG. 3A.

FIG. 3B is a view schematically illustrating a projection image Im0 of the light emitting surface on the back focus surface 12Fs of the condensing optical system 12 by the optical system in FIG. 3A when viewed from the similar direction as in FIG. 2. The light emission surface 11*s* of the collimating optical system 11 in FIG. 2 is indicated by a broken line with the axis B made to coincide. Note that the axis A having an optically equivalent relationship with the axis B is illustrated to coincide with the axis B.

A length between an end 12Fsp1 and an other end 12Fsp2, which is the width of the projection image of the light emitting surface on the back focus surface 12Fs of the condensing optical system 12 on the axis B, is defined as a width a of the projection image of the light emitting surface on the back focus surface 12Fs of the condensing optical system 12. Here, the outer edge of the projection image at the back focus 12F is regarded as having, as a boundary, a value (half value) that is 50% of the peak intensity in the in-plane irradiance distribution of the projection image.

Figure 3C:
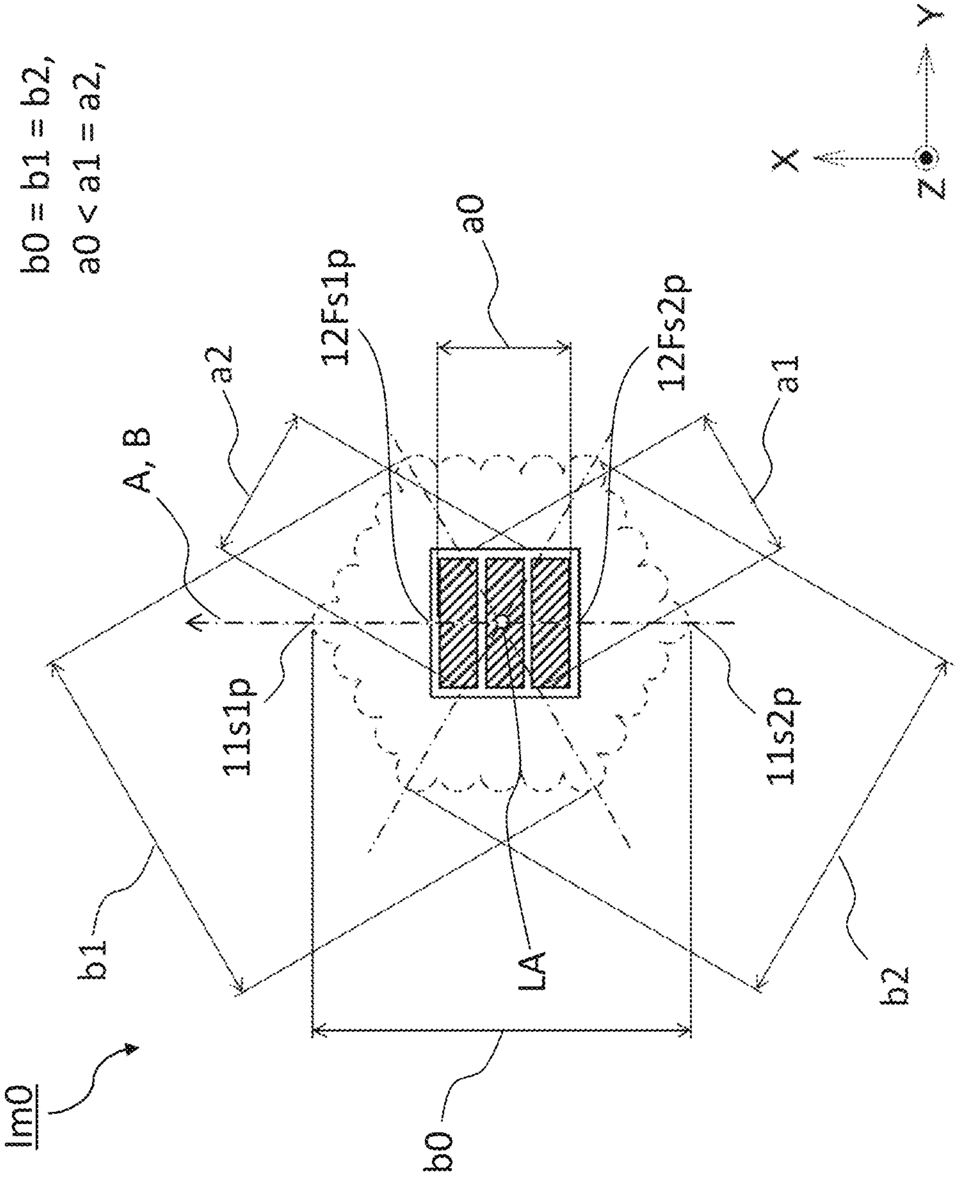
FIG. 3C is another form of the optical system in FIG. 3B.

FIG. 3C is another form of FIG. 3B. As illustrated in FIG. 3C, in a case where there are a plurality of axes having the maximum width (b0, b1, b2) of the collimating optical system 11, an axis having the shortest width among the widths (a0, a1, a2) of the projection image of the light emitting surface extending on the above axes is determined as the axis A. An end 11*s*1*p* of the maximum width of the collimating optical system 11, an other end 11*s*2*p* of the maximum width of the collimating optical system 11, the end 12Fsp1 of the width of the projection image of the light emitting surface, and the other end 12Fsp2 of the width of the projection image of the light emitting surface are all defined on the axis B and the axis A optically equivalent to the axis B.

Figure 4A:
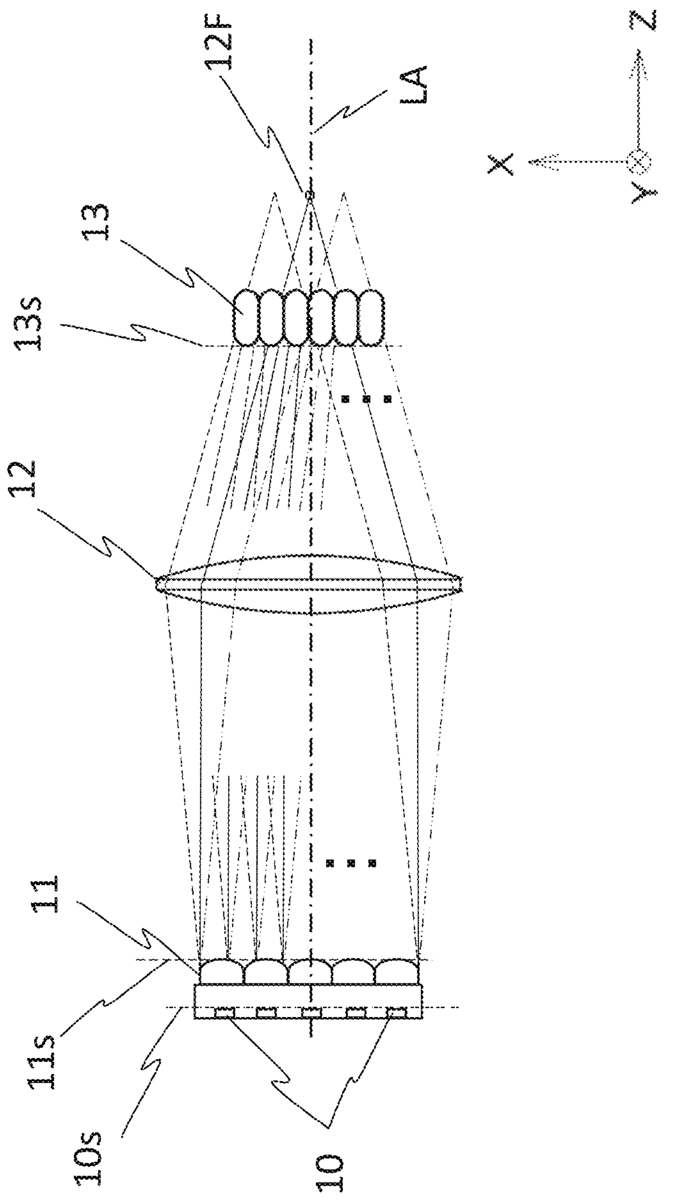
FIG. 4A is a view schematically illustrating a state in which light emitted from an arbitrary point of each lens element of the collimating optical system is projected on an incident surface of the fly eye lens.

FIG. 4A is a view schematically illustrating a state in which light emitted from each light emitting element 10 is incident on the incident surface 13*s* of the fly eye lens 13 through the collimating optical system 11 and the condensing optical system 12. The light emitted from an arbitrary point on the light emission surface 11*s* of the collimating optical system 11 is projected onto the incident surface 13*s* of the fly eye lens 13 through the condensing optical system 12.

Figure 4B:
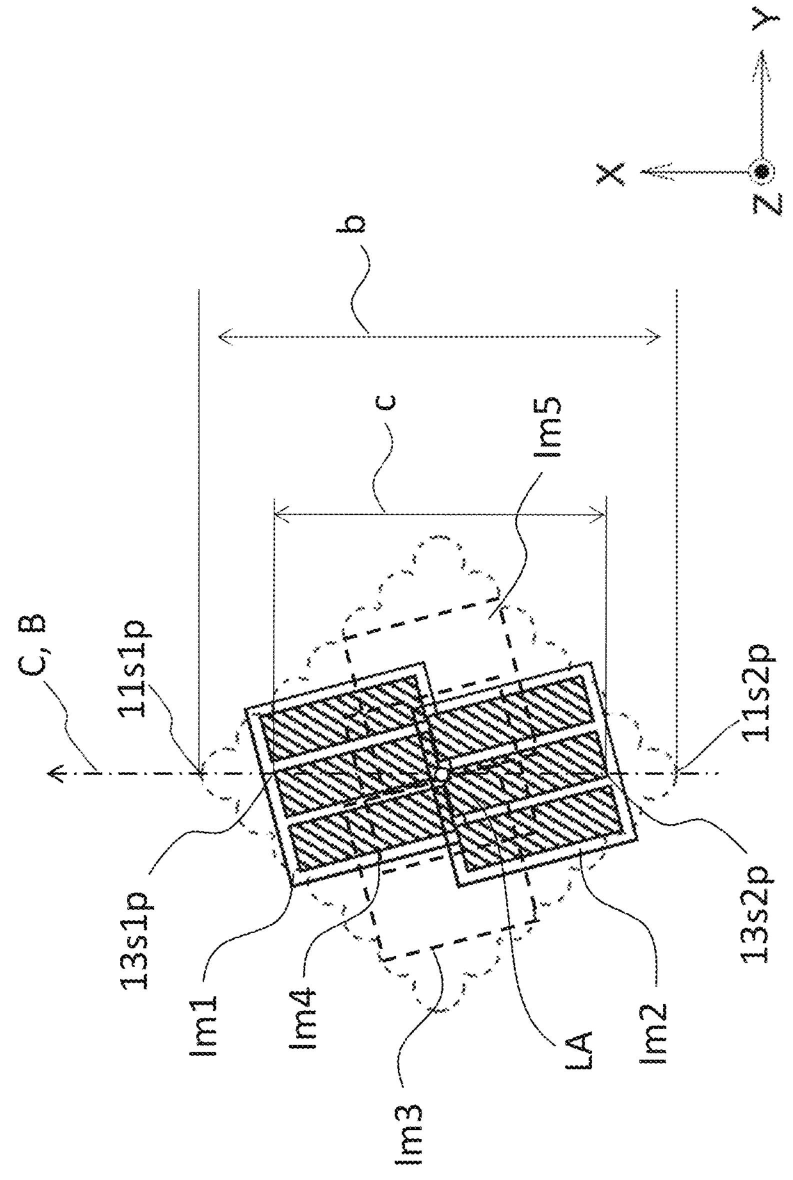
FIG. 4B is a view schematically illustrating an example of a correspondence relationship between an image projected on the incident surface of a fly eye integrator optical system by the optical system in FIG. 4A and the collimating optical system.

FIG. 4B is a view schematically illustrating an example of an image projected on the incident surface 13*s* of the fly eye lens 13. Note that, in FIG. 4B, for convenience of illustration, five projection images Im1 to Im5 are illustrated as the projection images of the light emitting surface on the incident surface 13*s* of the fly eye lens 13, but in an actual case, the projection images are constituted of countless projection images emitted from an infinite number of arbitrary points on the light emission surface 11*s* of the collimating optical system 11. Combining the projection images results in a blurred image. Similarly to FIG. 3B, the light emission surface 11*s* of the collimating optical system 11 is indicated by a broken line while the axis B is made to coincide with the optically equivalent axis C.

The length between an end 13*sp*1 and an other end 13*sp*2 of the width of the projection image of the light emitting surface on the incident surface 13*s* of the fly eye lens 13 on the axis C optically equivalent to the axis B is defined as a width c of the projection image of the light emitting surface on the incident surface 13*s* of the fly eye lens 13. Concerning the outer edges of the projection images Im1 to Im5 of the light emitting surface on the incident surface 13*s* of the fly eye lens 13 here, a value that is 10% with respect to the peak intensity in the in-plane distribution of the projection image is regarded as a boundary.

Figure 5:
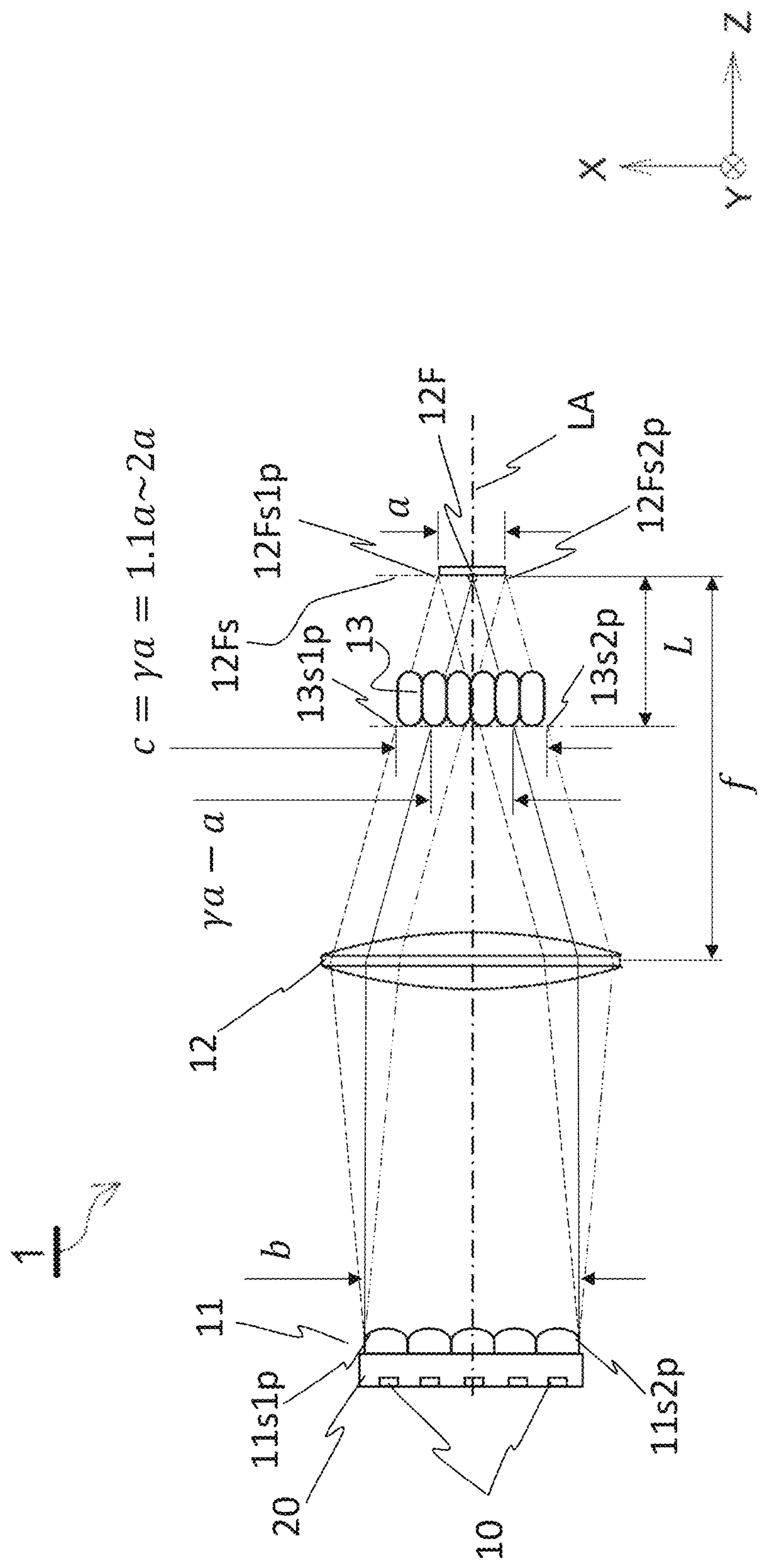
FIG. 5 is a schematic view for explaining an arrangement relationship of the optical systems.

FIG. 5 is a schematic ray diagram for explaining an optical relationship of the light source device 1, and conceptually illustrates rays emitted from the end 11*s*1*p* and the other end 11*s*2*p* whose distance therebetween is the maximum width of the collimating optical system 11.

A focal length f of the condensing optical system 12 is a distance to the back focus 12F where light is condensed when parallel rays pass through the condensing optical system 12. Specifically, the focal length is regarded as a back focus position where the light intersects the center axis (optical axis) of the condensing optical system 12 when a ray parallel to the optical axis is incident on the condensing optical system 12 from the end 11*s*1*p* of the maximum width of the collimating optical system 11, and is defined by a distance between the condensing optical system 12 and the back focus 12F.

A separation distance L is defined by a separation distance between the back focus 12F of the condensing optical system 12 and the incident surface 13*s* of the fly eye lens 13.

The separation distance L may be set in either the precedent stage side (−LA direction) or the subsequent stage side (+LA direction) of the optical axis LA with respect to the back focus 12F of the condensing optical system 12. More specifically, the separation distance may be set in a form in which the incident surface 13*s* of the fly eye lens 13 is disposed to be separated from the back focus 12F on the subsequent stage side (+LA direction) of the optical axis LA.

The magnification of the width c of the projection image of the light emitting surface on the incident surface 13*s* of the fly eye lens 13 with respect to the width a of the projection image of the light emitting surface on the back focus surface 12Fs of the condensing optical system 12 is referred to as a predetermined magnification γ.

Figure 6:
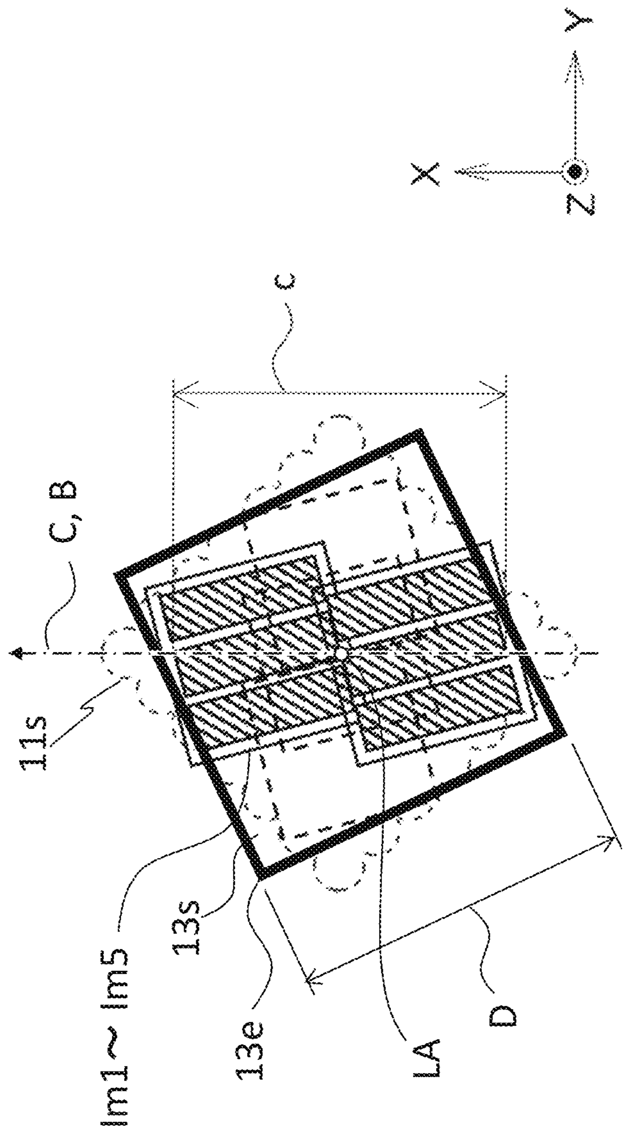
FIG. 6 is a view schematically illustrating an example of a correspondence relationship between an image projected on the incident surface of the fly eye lens and an outline of the incident surface of the fly eye lens.

FIG. 6 is a view schematically illustrating an example of a correspondence relationship between an outline 13*e* of the fly eye lens 13 and the projection images Im1 to Im5 of the light emitting surface on the incident surface 13*s* of the fly eye lens 13. The minimum width of the incident surface 13*s* of the fly eye lens 13 is defined as the width D of the fly eye lens 13. Similarly to FIG. 3B, the light emission surface 11*s* of the collimating optical system 11 is indicated by a broken line while the axis B is made to coincide with the axis C.

Hereinafter, a positional relationship of each element included in the light source device 1 will be described.

As illustrated in FIG. 3A, images of the light emitting surfaces 10*s* of the light emitting elements (10, 10, . . . ) are projected on the back focus surface 12Fs of the condensing optical system 12 in an overlapping manner without deviation. This allows the light emitting regions of the light emitting surfaces 10*s* to overlap each other without deviation, and the non-light emitting regions of the light emitting surfaces 10*s* to overlap each other without deviation. Therefore, the image projected on the back focus 12F of the condensing optical system 12 becomes a projection image Im0 in which the light emitting surface 10*s* of the light emitting element having a light emitting region Ima and a non-light emitting region Imb relatively easily visually recognized is projected almost as it is as illustrated in FIG. 3B.

However, when an image in which the light emitting region Ima and the non-light emitting region Imb can be clearly recognized is incident on the incident surface 13*s* of the fly eye lens 13, as described above, the irradiance distribution becomes non-uniform with high probability on the irradiation surface after passing through the fly eye integrator optical system.

On the other hand, as illustrated in FIGS. 1A and 1B, in a case where the back focus 12F of the condensing optical system 12 and the incident surface 13*s* of the fly eye lens 13 do not coincide with each other and are disposed apart from each other by the separation distance L, the regions with high irradiance are suppressed from overlapping each other and the regions with low irradiance are suppressed from overlapping each other in the projection image of each light emitting element (10, 10, . . . ), which suppresses a significant difference in irradiance.

As illustrated in FIG. 4A, the light emitted from the light emitting surface 10*s* of each light emitting element (10, 10, . . . ) is collimated by the collimating optical system 11 and projected on the incident surface 13*s* of the fly eye lens 13 at a position separated from the back focus 12F of the condensing optical system 12. At this time, by the incident surface 13*s* of the fly eye lens 13 being disposed at a position different from the back focus 12F of the condensing optical system 12, as illustrated in FIG. 4B, the image reflected on the incident surface 13*s* of the fly eye lens 13 in the light source device 1 becomes a blurred image including the countless projection images Im1 to Im5 of the light emitting surface on the incident surface 13*s* of the fly eye lens 13.

Then, by forming the blurred image, the overlapping of the light emitting regions Ima with each other and the overlapping of the non-light emitting regions Imb with each other of the images are suppressed, and the image without the significant difference in the irradiance distribution is incident on the incident surface 13*s* of the fly eye lens 13.

However, the significant difference in the irradiance distribution of the projection image incident on the incident surface 13*s* of the fly eye lens 13 is not sufficiently suppressed in a case where the countless projection images Im1 to Im5 are only slightly deviated from each other.

Here, the present inventor has set conditions for sufficiently suppressing the significant difference in the irradiance distribution of the projection image incident on the incident surface 13*s* of the fly eye lens 13 through intensive studies.

Under this condition, by setting the width c of the projection image of the light emitting surface on the incident surface 13*s* of the fly eye lens 13 to a region larger than at least 1.1 times the width a of the projection image of the light emitting surface on the incident surface 13*s* of the fly eye lens 13, the significant difference is suppressed in the irradiance distribution of the projection image incident on the incident surface 13*s* of the fly eye lens 13.

According to this condition, the projection image is not formed to have the light emitting surface in which the light emitting region Ima and the non-light emitting region Imb are relatively easily visually recognized, but a more uniform projection image is easily formed.

Note that, on the other hand, on the incident surface 13*s* of the fly eye lens 13, if the width c of the projection image of the light emitting surface on the incident surface 13*s* of the fly eye lens 13 is enlarged to at least twice or more of the width a of the projection image of the light emitting surface on the back focus 12F of the condensing optical system 12, the overlapping of the projection images Im1 to Im5 of the light emitting surface on the incident surface 13*s* of the fly eye lens 13 becomes reduced, and there will be no longer the overlapping region of the farthest images Im1 and Im2 present.

From the above facts, therefore, the width c is the predetermined magnification γ times of the width a. The preferable magnification range is as follows.

$$1.1<\gamma<2.0$$

It can be said that the width c of the projection image of the light emitting surface on the incident surface 13*s* of the fly eye lens 13 is preferably within a range of the following Formula (3) obtained by multiplying the above formula by the width a and replacing aγ=c.

$$1.1a<c<2.0a \tag{3}$$

Because the separation distance L, the ratio of the length (γa−a) obtained by subtracting the width a from the width γa to the maximum width b of the collimating optical system 11, and the ratio of the absolute value of the separation distance L to the focal length f of the condensing optical system 12 are equal, the relationship of the following Formula (4) is derived.

$$(\gamma - 1)a : b = |L| : f \quad (4)$$

The following Formula (5) is obtained from the above Formula (4).

$$\gamma = (b \cdot |L|)/(a \cdot f) + 1 \quad (5)$$

Furthermore, the following Formula (6) is obtained from the above Formula (3) and the above Formula (5).

$$1.1 < (b \cdot |L|)/(a \cdot f) + 1 < 2.0 \quad (6)$$

Then, Formula (1) is obtained by modifying Formula (6). To be sure, Formula (1) is provided again.

[Math 3]

$$0.1 < \frac{b|L|}{af} < 1 \quad (1)$$

Note that, Formula (7) is obtained by modifying Formula (1).

$$0.1af/b < |L| < 1.0af/b \quad (7)$$

That is, by setting the separation distance L within the range of the above Formula (7), the width c of the projection image of the light emitting surface on the incident surface 13*s* of the fly eye lens 13 is designed to satisfy the above Formula (1).

Furthermore, in the above Formulas (3) and (6), the range of the magnification γ is set to a range larger than 1.1 and smaller than 2, but if the range of the width c (γa) becomes too large, the degree of overlapping of the respective images becomes small, and the irradiance on the incident surface tends to become small. Therefore, the magnification γ is desirably set to a range smaller than 1.5 times. Therefore, the separation distance L is more desirably set within a range of the following Formula (8).

$$0.1af/b < |L| < 0.5af/b \quad (8)$$

Still further, in the above Formula (8), from the viewpoint of ensuring more stable uniformity of the irradiance distribution of the projection image, the range of the magnification γ is more desirably set to a range larger than 1.2 times and smaller than 1.5 times. Therefore, the separation distance L is more desirably set within a range of the following Formula (9).

$$0.2af/b < |L| < 0.5af/b \quad (9)$$

As illustrated in FIG. 6, in a case where the minimum width D of the fly eye lens 13 is at least larger than the entire width c of the projected projection image, substantially all the active components of the bundle of rays collimated by the collimating optical system 11 is incident on the incident surface 13*s* of the fly eye lens 13. Therefore, from the viewpoint of light utilization efficiency, the relationship of D>c is preferably satisfied.

Then, the above Formula (2) is obtained from the relationship of D>c and the above Formula (5). To be sure, Formula (2) is provided again.

[Math 4]

$$D > \frac{b|L|}{f} + a \quad (2)$$

Note that, although it is merely an example, in the present embodiment, the width b is set to 90 mm, and the width a is designated to be 60 mm by using the condensing optical system 12 having the focal length f of 400 mm. Then, by setting the separation distance L within the range of 26.7 mm to 133 mm, the image projected on the incident surface 13*s* of the fly eye lens 13 is adjusted to the irradiance distribution without the significant difference.

That is, according to the above configuration, as compared with the light source device of the conventional configuration in which the projection images Im1 to Im5 of the light emitting surface on the incident surface 13*s* of the fly eye lens 13 is formed at substantially the same position, the projection image is sufficiently dispersed, and the irradiance distribution without the significant difference is realized.

The configuration of the light source device 1 described above is merely an example, and the present invention is not limited to each illustrated configuration.

What is claimed is:

1. A light source device with fly-eye integrator comprising:

a plurality of light emitting elements;

a collimating optical system that includes a plurality of lens regions each disposed corresponding to each of the plurality of light emitting elements at a subsequent stage of the plurality of light emitting elements and collimates light from a front focus of the lens regions;

a condensing optical system that condenses light emitted from the collimating optical system; and a fly eye lens on which the light emitted from the condensing optical system is incident, wherein, it is defined that a focal length of the condensing optical system is f, a width orthogonal to an optical axis and having a maximum width of the collimating optical system is b, an axis coinciding with a line segment constituting the width b is an axis B, a width of a projection image on an axis optically equivalent to the axis B is a, the projection image being on a light emitting surface on a back focus surface of the condensing optical system, and a separation distance between an incident surface of the fly eye lens and a back focus of the condensing optical system is L, the light source device satisfies the following Formula (1)

[Math 1]

$$0.1 < \frac{b|L|}{af} < 1. \tag{1}$$

2. The light source device with fly-eye integrator according to claim 1, wherein, it is defined that a minimum width of an incident surface of the fly eye lens is D, the width D satisfies the following Formula (2)

[Math 2]

$$D > \frac{b|L|}{f} + a. \tag{2}$$

* * * * *